United States Patent
Du et al.

(10) Patent No.: US 11,210,209 B2
(45) Date of Patent: Dec. 28, 2021

(54) METHOD FOR MANAGING FLASH MEMORY MODULE AND ASSOCIATED FLASH MEMORY CONTROLLER AND ELECTRONIC DEVICE

(71) Applicant: Silicon Motion, Inc., Hsinchu County (TW)

(72) Inventors: Jian-Dong Du, Taoyuan (TW); Pi-Ju Tsai, New Taipei (TW); Tsung-Chieh Yang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 32 days.

(21) Appl. No.: 16/686,214

(22) Filed: Nov. 18, 2019

(65) Prior Publication Data

US 2020/0242026 A1  Jul. 30, 2020

(30) Foreign Application Priority Data

Jan. 29, 2019  (TW) .................... 108103265

(51) Int. Cl.
| | |
|---|---|
| *G06F 12/02* | (2006.01) |
| *G06F 12/0882* | (2016.01) |
| *G06F 3/06* | (2006.01) |
| *G06F 13/16* | (2006.01) |
| *G06F 12/0891* | (2016.01) |
| *G06F 11/07* | (2006.01) |

(52) U.S. Cl.
CPC .......... *G06F 12/0246* (2013.01); *G06F 3/064* (2013.01); *G06F 3/0608* (2013.01); *G06F 3/0652* (2013.01); *G06F 3/0679* (2013.01); *G06F 11/076* (2013.01); *G06F 12/0253* (2013.01); *G06F 12/0882* (2013.01); *G06F 12/0891* (2013.01); *G06F 13/1668* (2013.01)

(58) Field of Classification Search
CPC ............ G06F 12/0246; G06F 12/0891; G06F 12/0882; G06F 12/0253; G06F 3/0608; G06F 3/064; G06F 3/0652; G06F 3/0679; G06F 11/076; G06F 13/1668
USPC ........................................................ 711/154
See application file for complete search history.

(56) References Cited

U.S. PATENT DOCUMENTS

| | | | |
|---|---|---|---|
| 8,458,417 B2* | 6/2013 | Goss ................... | G06F 11/0727 711/159 |
| 9,122,593 B2 | 9/2015 | Goss | |
| 9,430,376 B2 | 8/2016 | Horn | |
| 9,639,463 B1 | 5/2017 | Kankani | |
| 2008/0109590 A1* | 5/2008 | Jung ................... | G06F 12/0246 711/103 |
| 2010/0005225 A1* | 1/2010 | Honda .................. | G06F 3/0679 711/103 |

(Continued)

*Primary Examiner* — William E. Baughman
(74) *Attorney, Agent, or Firm* — Winston Hsu

(57) ABSTRACT

The present invention provides a method for managing a flash memory module, wherein the flash memory module includes a plurality of flash memory chips, each flash memory chip includes a plurality of blocks, and each block includes a plurality of pages, and the method includes the steps of: using a time management circuit to generate current time information; when data is written into any one of the blocks, recording the time information generated by the time management circuit; and determining at least one specific block according to quantity of invalid pages within each block and the time information of each block.

18 Claims, 6 Drawing Sheets

(56) References Cited

U.S. PATENT DOCUMENTS

| | | | |
|---|---|---|---|
| 2010/0332943 A1* | 12/2010 | D'Abreu | G06F 11/1068 714/763 |
| 2011/0055455 A1* | 3/2011 | Post | G06F 12/0246 711/103 |
| 2012/0030413 A1* | 2/2012 | Miyagawa | G06F 12/0246 711/103 |
| 2012/0066438 A1* | 3/2012 | Yoon | G06F 12/0246 711/103 |
| 2013/0166824 A1* | 6/2013 | Shim | G06F 12/0246 711/103 |
| 2014/0304458 A1* | 10/2014 | Chyan | G06F 3/0679 711/103 |
| 2016/0179386 A1* | 6/2016 | Zhang | G06F 3/0688 711/103 |
| 2017/0220623 A1* | 8/2017 | Blount | G06F 16/24578 |
| 2018/0267720 A1* | 9/2018 | Goldberg | G06F 3/0619 |
| 2019/0332323 A1* | 10/2019 | Choi | G06F 3/0604 |
| 2019/0377512 A1* | 12/2019 | Hodes | G06F 3/0652 |
| 2020/0097403 A1* | 3/2020 | Saxena | G06F 12/0246 |
| 2020/0133845 A1* | 4/2020 | Kim | G06F 12/121 |

* cited by examiner

| Block index | Number of invalid pages |
|---|---|
| B1 | 20 |
| B2 | 35 |
| B3 | 60 |
| B4 | 74 |
| B5 | 75 |
| B6 | 10 |
| B7 | 80 |
| B8 | 15 |
| B9 | 30 |
| B10 | 16 |
| ⋮ | ⋮ |

FIG. 5

METHOD FOR MANAGING FLASH MEMORY MODULE AND ASSOCIATED FLASH MEMORY CONTROLLER AND ELECTRONIC DEVICE

BACKGROUND OF THE INVENTION

1. Field of the Invention

The present invention relates to a flash memory controller.

2. Description of the Prior Art

With the developments of flash memory techniques, the arrangement of memory units in a flash memory chip has changed from parallel arranging fashions to stacked multi-layer fashions, which allows a chip to comprise more memory units and therefore increases the overall capacity of the chip. However, the aforementioned 3D flash memory design may suffer from some data retention issues, such as, the data quality thereof could drops drastically right after the chip is written with data, making the data be read incorrectly. Further, data may also suffer from the read disturbing issues when being read too often, thereby further deteriorating the data quality.

SUMMARY OF THE INVENTION

Therefore, the present invention proposes a method for managing a flash memory, which is achieved by further referring to the time information of blocks when storing data, to determine the sequential order of performing the garbage collecting operation. The proposed method may effectively solve the data retention issues as well as the reading interference issues of blocks.

An embodiment of the present invention discloses a flash memory controller, wherein the flash memory controller is arranged to access a flash memory module, the flash memory module comprises multiple flash memory chips, each of the flash memory chips comprises multiple blocks, each of the block comprises multiple pages, and the flash memory controller comprises a read only memory (ROM), a microprocessor and a time management circuit. The ROM is arranged to store a program code. The microprocessor is arranged to execute the program code to control the access of the flash memory module. The time management circuit is coupled to the microprocessor and arranged to generate current time information. When the microprocessor writes data into any block of said multiple blocks, the microprocessor records the time information generated by the time management circuit; and the microprocessor further selects at least one specific block that needs to be performed with a garbage collecting operation according to the number of invalid pages in each block and the time information of said each block.

Another embodiment of the present invention discloses a method for managing a flash memory module. The flash memory module comprises multiple flash memory chips, each of the flash memory chips comprises multiple blocks, and each of the block comprises multiple pages. The method comprises: using a time management circuit to generate current time information; recording the time information generated by the time management circuit when data is written into any block of said multiple blocks; and selecting at least one specific block that needs a garbage collecting operation according to the number of invalid pages in each block and the time information corresponding to said each block.

Yet another embodiment of the present invention discloses an electronic device which comprises a flash memory module and a flash memory controller. The flash memory module comprises multiple flash memory chips, each of the flash memory chips comprises multiple blocks, and each of the blocks comprises multiple pages. The flash memory controller is arranged to access the flash memory module. The flash memory controller generates current time information, and when the flash memory controller writes data into any block of said multiple blocks, the flash memory controller records the time information generated by the time management circuit. The flash memory controller further selects at least one specific block that needs to be performed with a garbage collecting operation according to the number of invalid pages in each block and the time information corresponding to said each block.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a diagram illustrating the number of invalid pages in each block according to an embodiment of the present invention.

DETAILED DESCRIPTION

Figure 1:
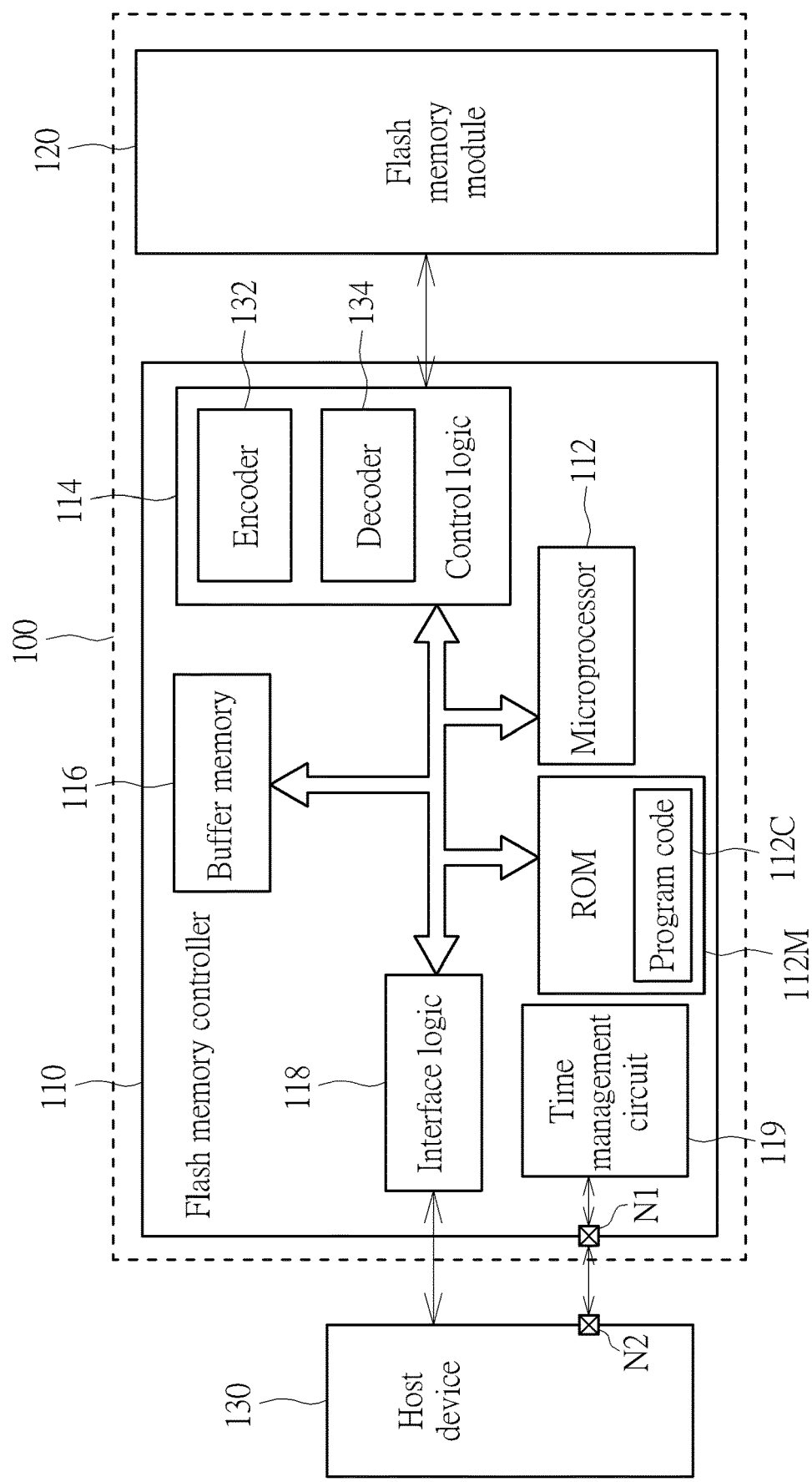
FIG. 1 is a diagram illustrating a memory device according to a first embodiment of the present invention.

FIG. 1 is a diagram illustrating a memory device 100 according to a first embodiment of the present invention. The memory device 100 comprises a flash memory module 120 and a flash memory controller 110, and the flash memory controller 110 is arranged to access the flash memory module 120. In this embodiment, the flash memory controller 110 comprises a microprocessor 112, a read only memory (ROM) 112M, a control logic 114, a buffer memory 116, an interface logic 118 and a time-management circuit 119. The ROM 112M is arranged to store a program code 112C, and the microprocessor 112 is arranged to execute the program code 112C to control the access of the flash memory module 120. The control logic 114 comprises an encoder 132 and a decoder 134, wherein the encoder 132 is arranged to encode the data written into the flash memory module 120 in order to generate a corresponding checking code (which can be also called as error correction code (ECC)), and the decoder 134 is arranged to decode the data read from the flash memory module 120.

Typically, the flash memory module 120 comprises multiple flash memory chips, and each flash memory chip comprises a plurality of blocks. The flash memory controller 110 may use "block" as the unit to erase data from the flash memory module 120. A block may record a specific number of pages, and the flash memory controller 110 may use "page" as the unit to write data into the flash memory module 120. In this embodiment, the flash memory module 120 may be a 3D NAND-type flash memory module.

In practice, the flash memory controller 110 may utilize the internal elements thereof to use the microprocessor 112 to execute the program code 112C, in order to perform various control operations, such as utilizing the control logic 114 to control the access of the flash memory module 120 (more particularly, the access of at least one block or at least one page), utilizing the buffer memory 116 to perform the required buffering process, and utilizing the interface logic 118 to communicate with a host device 130. Further, the time-management circuit 119 may be connected to a specific pin N2 of the host device via a specific pin N1 of the flash memory controller. The buffer memory 116 may be implemented with a random access memory (RAM). For example, the buffer memory 116 may be a static random access memory (SRAM), but the present invention is not limited thereto.

In an embodiment, the memory device 100 may be a portable memory device (e.g. a memory card conforming to the SD/MMC, CF, MS and/or XD specification), and the host device 130 is an electronic device connectable to an electronic device, such as a smartphone, laptop computer, desktop computer, etc. In another embodiment, the memory device 100 may be a solid state drive (SSD) or an embedded storage device conforming to the Universal flash storage (UFS) or Embedded Multi Media Card (EMMC) specification. The memory device 100 can be installed in an electronic device, such as a smartphone, laptop computer or desktop computer, wherein the host device 130 may be a processor of the electronic device.

Figure 2:
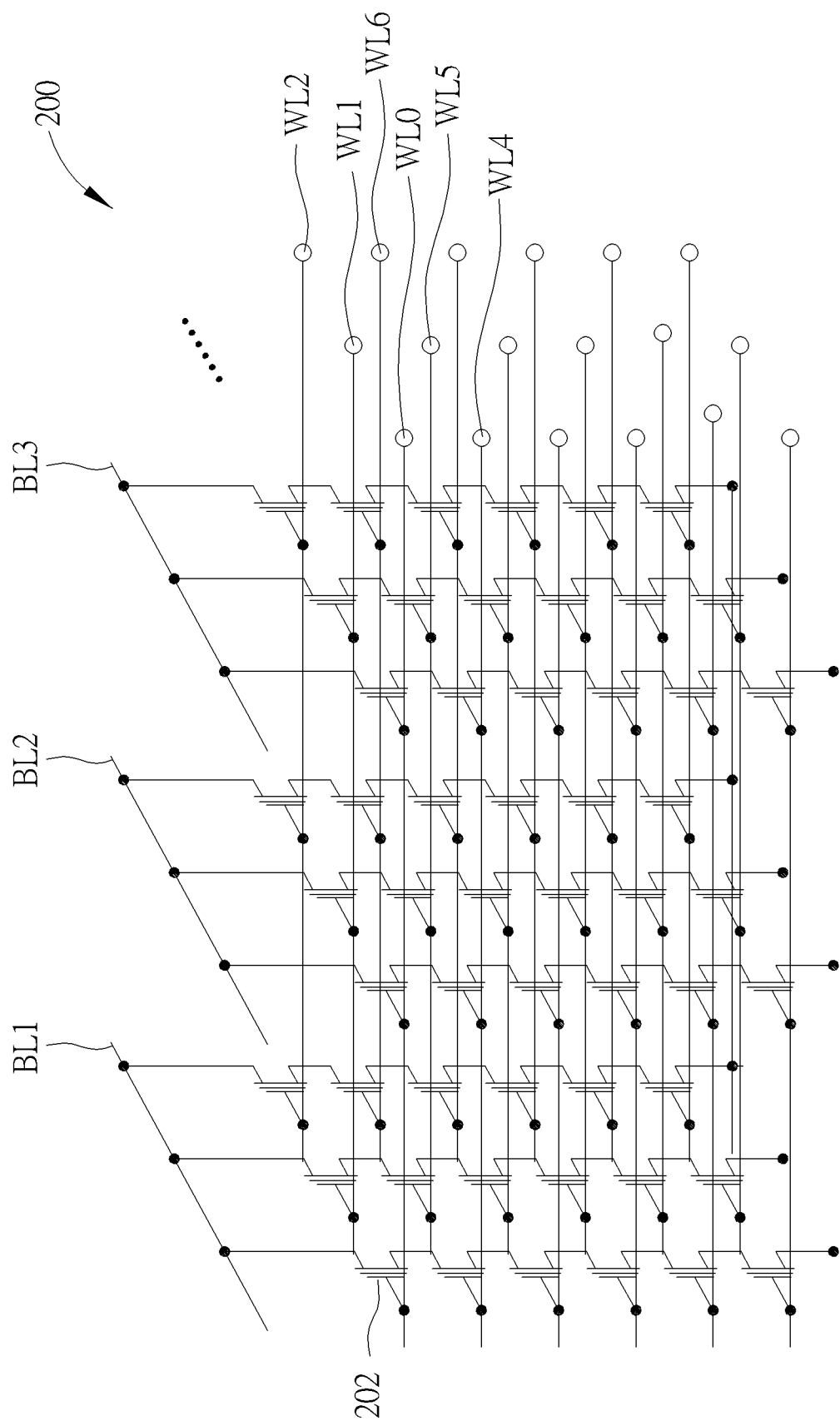
FIG. 2 is a diagram illustrating a block of a flash memory module according to an embodiment of the present invention.

FIG. 2 is a diagram illustrating a block 200 in the flash memory module 120 according to an embodiment of the present invention, wherein the flash memory module 120 is a 3D NAND-type flash memory. As shown in FIG. 2, the block 200 comprises multiple memory units (e.g. the floating-gate transistor 202 or the charge trapping elements shown in the figure), and constructs a 3D NAND-type flash memory structure with multiple bit lines (e.g. the bit lines BL1-BL3 shown in the figure) and multiple word lines (e.g. the word lines WL0-WL2, WL4-WL6 shown in the figure). Please refer to FIG. 2, taking the uppermost plane as an example, all floating-gate transistors on the word line WL0 construct at least one page, all floating-gate transistors on the word line WL1 construct at least another page, and all floating-gate transistors on the word line WL2 further construct at least another page, and so on. Furthermore, based on different writing methods of the flash memory, the definition between the word line WL0 and the page can be different. Specifically, when writing in the single-level cell (SLC) manner, all floating-gate transistors on the word line WL0 are only corresponding to one single logic page; when writing in the multi-level cell (MLC) manner, all floating-gate transistors on the word line WL0 are corresponding to two logic pages; when writing in triple-level cell (TLC) manner, all floating-gate transistors on the word line WL0 are corresponding to three logic pages; and when writing using quad-level cell (QLC) manner, all floating-gate transistors on the word line WL0 are corresponding to four logic pages. Since one skilled in the art should be readily to understand the structure and of a 3D NAND-type flash memory and the relationship between word lines and pages, the detailed descriptions thereof are omitted here for brevity.

The architecture shown in FIG. 2 is merely a rough illustration of the basic structure of the 3D flash memory, while in an actual manufacturing process, more stack layers might be applied in order to reach a denser storage capacity. Since the 3D flash memory adopts the stacked structure shown in FIG. 2, data storing may suffer severe data retention problems. That is, if the data is written into the block 200, after a period of time, the memory units therein will encounter problems on data quality such as the data writing level shift, threshold voltage drift, etc., resulting in difficulties of decoding the data read from the block 200, or even resulting in data lost due to unsuccessful decoding. Further, the aforementioned stacked structure also deteriorates the reading interference problems. To address this issue, this embodiment proposes a method for managing the flash memory module 120, which may place a time management circuit 119 in the flash memory controller 110 to effectively record the time information of each block, which can be referred by the microprocessor 112 when there is a need for creating the sequential order of the garbage collecting operation. The operational details are described as follows.

Figure 3:
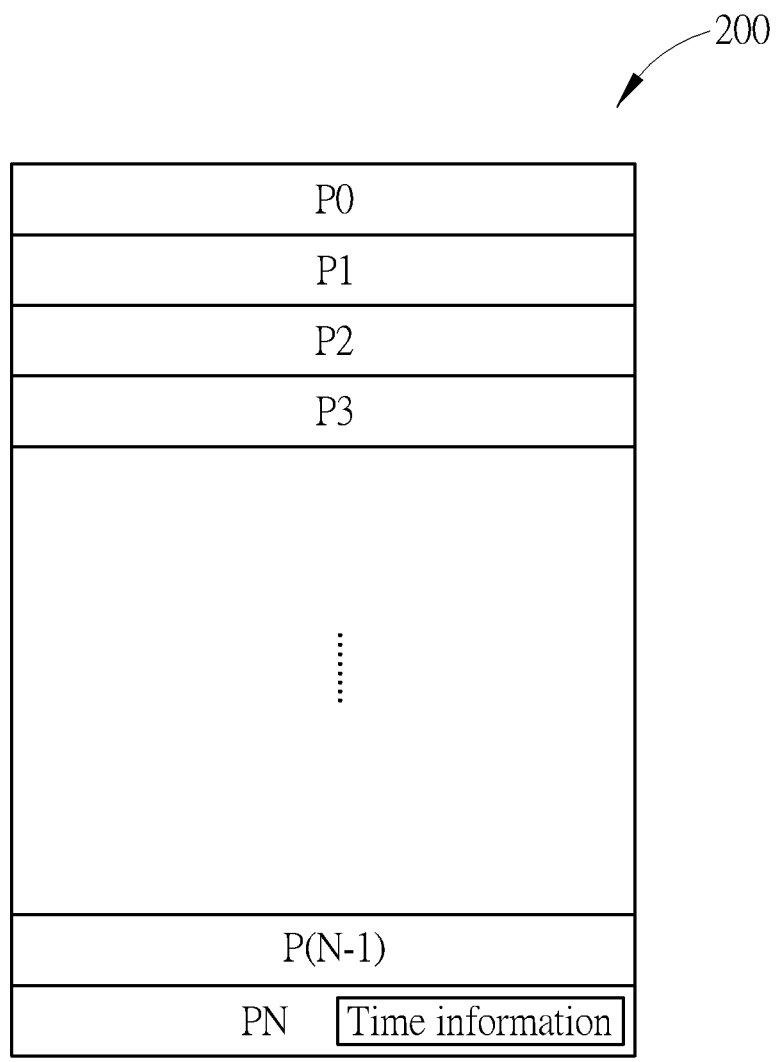
FIG. 3 is a diagram illustrating pages in a block.

FIG. 3 depicts a block 200 that comprises multiple pages P0-PN. When the flash memory controller 110 needs to write data into the block 200, such as the data from the host device 130, the data from other blocks of the flash memory module 120, and/or the data temporarily stored in the flash memory controller 110, the flash memory controller 110 may sequentially write the data into the pages, starting from the first page P0 to the last page PN. In this embodiment, when the flash memory controller 110 is going to write data into the very last page PN or last few pages, the time-management circuit 119 will send a request command to the host device 130 via the specific pin N1 in order to request the host device 130 to provide current time information. Since the host device 130 is connected to the operating system, the current time information (e.g. the month, date, minute, second, etc.) may be provided to the time-management circuit 119. After the time-management circuit 119 calculates the time information, it will provide the time information to the microprocessor 112, so as to be processed by the encoder 132 and be written along with other data into the page PN.

Since the last page PN of the block 200 records the absolute time (e.g. the timestamp), the microprocessor 112 may easily determine how long the data has been stored in the block 200 anytime, as a reference of deciding the sequential order of a later garbage collecting operation. It should be noted, however, although in the embodiment of FIG. 3, the last page PN of the block 200 records the time point of the last written data, this feature is not meant to be a limitation of the present invention. In other embodiments, the time information may not necessarily be corresponding to the last page PN, and the time information stored in the block 200 may be the time point where the block 200 starts storing data, or the time point of writing any data into the block 200, as long as the time information is able to show the time information of the data in the block 200.

Figure 4:
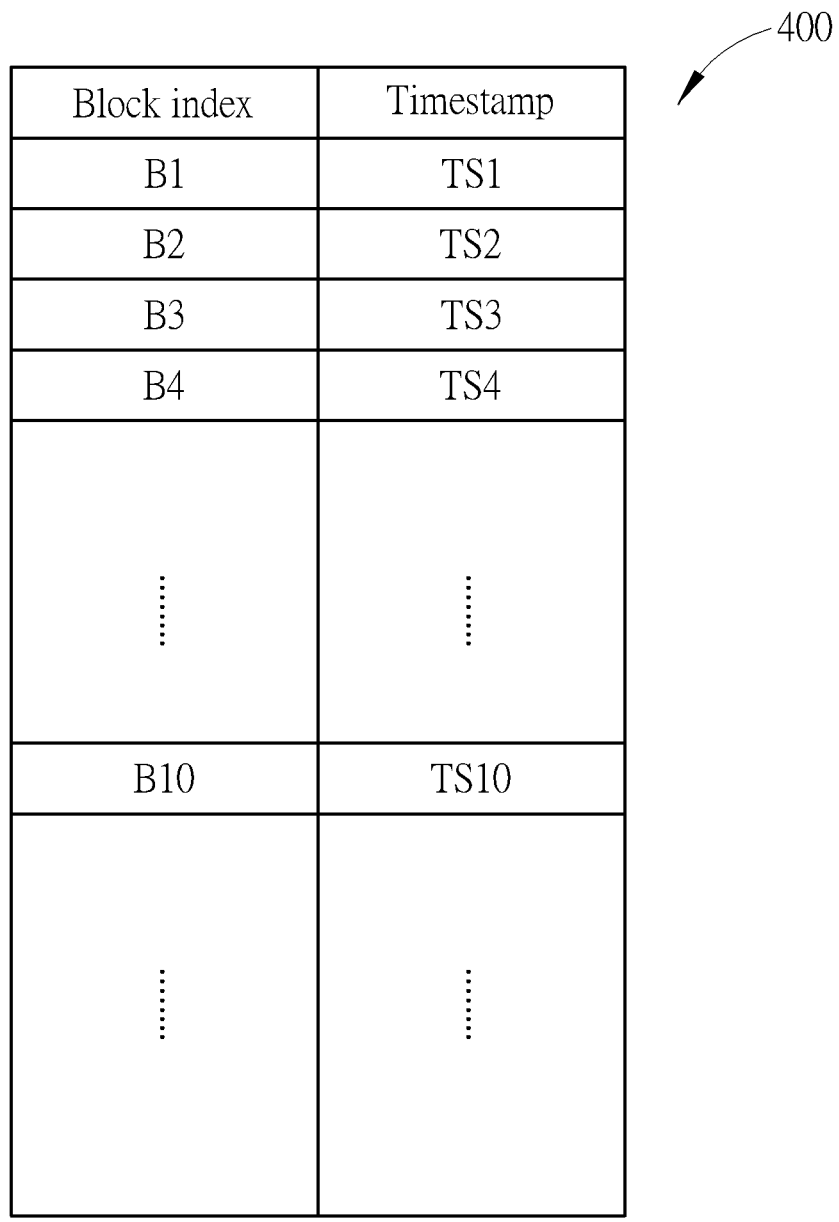
FIG. 4 is a diagram illustrating a time information comparison table according to an embodiment of the present invention.

In another embodiment of the present invention, except for writing the time information into the last page PN of each block, the microprocessor 112 may further create a time information comparison table 400 as shown in FIG. 4, which records the time information (e.g., the timestamps TS1-TS10 shown in FIG. 4) that are written into each block (e.g., the blocks B1-B10 in FIG. 4). In this embodiment, the time information comparison table 400 may be temporarily stored in an external dynamic random access memory or an internal buffer memory 116 of the flash memory controller 110, so that the flash memory controller 110 may quickly determine how long the data in each block has been stored, without the need for reading each block of the flash memory module 120, and the flash memory controller 110 may perform appropriate processing later.

Further, when the flash memory controller 110 is about to be powered off or the memory needs to release space, the time information comparison table 400 may be written to a proper address in the flash memory module 120 in order to prevent data lost.

In another embodiment, for more effectively using the memory space, the contents of the time information comparison table 400 may be integrated to another comparison table/mapping table (e.g. a logical address to physical address mapping table or a physical address to logical address mapping table).

It should be noted in the embodiment shown in FIG. 1, the time management circuit 119 directly obtains the current time information from the host device 130, so as to write the current time information into the last page PN of the block 200, but this is not a limitation of the present invention. In other embodiments of the present invention, the time management circuit 119 may calculate the current time information by using a counter or other means.

In another aspect, during the flash memory controller 110 writing data into the flash memory module 120, the microprocessor 112 may also create/update an invalid page number comparison table 500 shown in FIG. 5 according to the data written into the flash memory module 120, wherein the invalid page number comparison table 500 records each block (e.g., the blocks B1-B10 shown in FIG. 5) as well as the number of invalid pages in said each block. The following is an example illustrating the update operation of the invalid page number comparison table 500, assuming that the page P2 of the block B2 currently stores the data with a first logic address, and meanwhile, the microprocessor 112 receives a writing command from the host device 130, wherein the writing command comprises the first logic address and associated data. Since the writing command is arranged to update the contents stored by the page P2 of the block B2 (wherein the updated data will be written into another block), the page P2 of the block B2 may be later labeled as an invalid page. Meanwhile, the microprocessor 112 may add "1" onto the invalid page number of the block B2 recorded in the invalid page number comparison table 500.

Since the time information comparison table 400 records the time information of each block which may reveal whether the block has encountered data retention or reading interference problems. Hence, by referring the time information comparison table 400 and the invalid page number comparison table 500 to select multiple specific blocks that need to be performed with the garbage collecting operation, and by determining the sequential order of performing the garbage collecting operation, the problem that the blocks suffer from data retention or reading interference issues may be solved while the memory space is effectively released.

Specifically, when the flash memory controller 110 is not busy, or the flash memory controller 110 needs to perform the garbage collecting operation due to some triggering conditions (e.g., the space of the flash memory module 120 is insufficient), the microprocessor 112 will select multiple specific blocks that need to be performed with the garbage collecting operation and the sequential order thereof according to the time information comparison table 400 and the invalid page number comparison table 500, and then accordingly perform the garbage collecting operation. In a first example, the microprocessor 112 may refer to the invalid page number comparison table 500 first, to select a portion of blocks whose invalid page number is greater than a threshold value as said multiple specific blocks. Taking the threshold value "50" as an example, the microprocessor 112 may select blocks B3, B4, B5 and B7 to be performed with the garbage collecting operation. Next, the microprocessor 112 may further refer to the time information comparison table 400 to determine the sequential order of performing the garbage collecting operation upon the block B3, B4, B5 and B7. In an example, the microprocessor 112 refers to the timestamps TS3, TS4, TS5 and TS7 respectively corresponding to the blocks B3, B4, B5 and B7 to determine the sorting order, wherein the block with an earlier timestamp will have a higher priority, that is, a specific block corresponding to an earlier timestamp may be performed with the garbage collecting operation in a higher priority.

In a second example, the microprocessor 112 may refer to the time information comparison table 400 first, to select a portion of blocks corresponding to the time information that is earlier than a time point, as said multiple specific blocks. For example, assuming that the time point is 20 days, the microprocessor 112 may select blocks with the timestamp from the time information comparison table 400 more than 20 days earlier to be as said multiple specific blocks. The following illustrations assume that said multiple specific blocks are B2, B3, B4 and B7. Next, the microprocessor 112 further refers to the invalid page number comparison table 500 to determine the sequential order of the garbage collecting operation for the blocks B2, B3, B4 and B7. In an example, the microprocessor 112 may refer to the invalid page number corresponding to blocks B2, B3, B4 and B7 to determine the sorting thereof. Taking FIG. 5 as example, the sequential order of performing the garbage collecting operation is B7, B4, B3 and B2, sequentially.

In the third example, the microprocessor 112 may refer to the time information comparison table 400 first, to select a portion of blocks corresponding to time information earlier than a time point. For example, assuming that the time point is 20 days, the microprocessor 112 may select blocks with the timestamp from the time information comparison table 400 more than 20 days earlier, e.g. the blocks B2, B3, B4 and B7. After that, the microprocessor 112 further refers to the invalid page number comparison table 500 to select blocks with invalid page number greater than a threshold value from said at least one portion of block as said multiple specific blocks. Taking the threshold value "50" as an example, the microprocessor 112 may select the blocks B3, B4, B7 from the blocks B2, B3, B4 and B7 to be performed with the garbage collecting operation.

It should be noted, however, the above three embodiments are merely for illustrative purposes, and are not meant to be a limitation of the present invention. In other embodiments, as long as the sequential order of the garbage collecting operation can be determined according to the time information of the number of invalid pages in each block, various modifications made to the above embodiments shall belong to the scope of the present invention.

In other embodiment of the present invention, the microprocessor 112 may create the sequential order of blocks that need to be performed with the garbage collecting operation at any suitable time according to the contents of the above embodiments, to be used in the follow-up garbage collecting operation.

Figure 6:
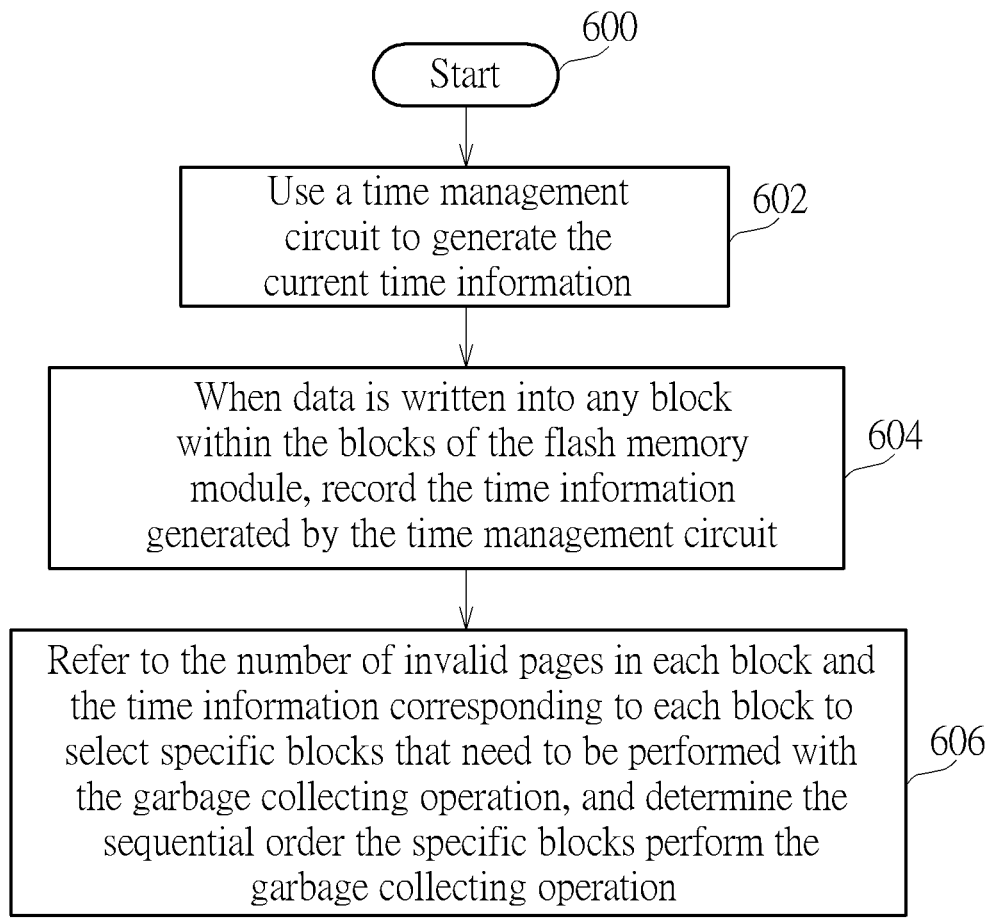
FIG. 6 is a flowchart illustrating a method for managing a flash memory module according to an embodiment of the present invention.

FIG. 6 is a flowchart illustrating a method for managing a flash memory module according to an embodiment of the present invention. The flowchart of FIG. 6 summarizes the contents of the aforementioned embodiments as follows:

Step 600: The flow begins.

Step 602: Use a time management circuit to generate the current time information.

Step 604: When data is written into any block within the blocks of the flash memory module, record the time information generated by the time management circuit.

Step 606: Refer to the number of invalid pages in each block and the time information corresponding to each block to select specific blocks that need to be performed with the garbage collecting operation, and determine the sequential order the specific blocks perform the garbage collecting operation.

To summarize, in the flash memory controller of the present invention, by referring to the number of invalid pages in each block and the time information of the block to determine the sequential order of performing the garbage collecting operation upon blocks, blocks that have more invalid pages or more likely suffer from data retention or reading interference problems may be preferentially performed with the garbage collecting operation. Therefore, the valid storage space of the flash memory module can be increased, thereby improving the overall data quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller, wherein the flash memory controller is arranged to access a flash memory module, the flash memory module comprises multiple flash memory chips, each of the flash memory chips comprises multiple blocks, each of the blocks comprises multiple pages, and the flash memory controller comprises:
a read only memory (ROM), arranged to store a program code;
a microprocessor, arranged to execute the program code to control the access of the flash memory module; and
a time management circuit, coupled to the microprocessor and arranged to generate current time information;
wherein when the microprocessor writes data into any block of said multiple blocks, the time management circuit sends a request command to a host device via a specific pin in order to request the host device to provide the current time information, and the microprocessor records the time information currently generated by the time management circuit, and writes the data with the time information into the block; and the microprocessor further selects at least one specific block to perform a garbage collecting operation on according to the number of invalid pages in each block and the time information of said each block.

2. The flash memory controller of claim 1, wherein the at least one specific block comprises multiple specific blocks, and the microprocessor further determines a sequential order to select the multiple specific blocks to perform the garbage collecting operation on according to the number of invalid pages in each block and the time information corresponding to said each block in order to determine the sequential order.

3. The flash memory controller of claim 1, wherein the microprocessor further creates a time information comparison table which records the time information corresponding to each block, and temporarily stores the time information comparison table in a dynamic random access memory (DRAM) or a buffer memory inside the flash memory controller.

4. The flash memory controller of claim 1, wherein the at least one specific block comprises multiple specific blocks, and the microprocessor selects a portion of blocks having the number of invalid pages greater than a threshold value from said multiple blocks as said multiple specific blocks, and then determines a sequential order to perform the garbage collecting operation upon said multiple specific blocks according to the time information corresponding to said multiple specific blocks.

5. The flash memory controller of claim 4, wherein specific blocks that correspond to earlier time information are of higher priority in the garbage collecting operation.

6. The flash memory controller of claim 1, wherein the at least one specific block comprises multiple specific blocks, and the microprocessor selects a portion of blocks that correspond to time information existing prior to a time point from said multiple blocks as said multiple specific blocks, and then determines a sequential order of performing the garbage collecting operation upon said multiple specific blocks according to the number of invalid pages in said multiple specific blocks.

7. The flash memory controller of claim 6, wherein specific blocks that correspond to more invalid pages are of higher priority in the garbage collecting operation.

8. The flash memory controller of claim 1, wherein the microprocessor selects a portion of blocks that correspond to time information existing prior to a time point from said multiple blocks, and then selects the at least one specific block having the number of invalid pages greater than a threshold value from the portion of blocks.

9. A method for managing a flash memory module, wherein the flash memory module comprises multiple flash memory chips, each of the flash memory chips comprises multiple blocks, each of the blocks comprises multiple pages, and the method comprises:
when data is written into any block of said multiple blocks, using a time management circuit to send a request command to a host device via a specific pin in order to request the host device to provide the current time information, and the time information is written with the data into the any block of said multiple blocks; and
selecting at least one specific block that needs a garbage collecting operation according to the number of invalid pages in each block and the time information corresponding to said each block.

10. The method of claim 9, wherein the at least one specific block comprises multiple specific blocks, and the method further comprises:
determining a sequential order to perform the garbage collecting operation upon said multiple specific blocks according to the number of invalid pages in each block and the time information corresponding to said each block.

11. The method of claim 9, further comprises:
creating a time information comparison table which records the time information corresponding to each block, and storing the time information comparison table temporarily into a dynamic random access memory or a buffer memory.

12. The method of claim 9, wherein the at least one specific block comprises multiple specific blocks, and the method further comprises:

selecting a portion of blocks having the number of invalid pages greater than a threshold value from said multiple blocks as said multiple specific blocks, and then determining a sequential order to perform the garbage collecting operation upon said multiple specific blocks according to the time information corresponding to said multiple specific blocks.

13. The method of claim 12, wherein specific blocks corresponding to earlier time information are of higher priority in the garbage collecting operation.

14. The method of claim 9, wherein the at least one specific block comprises multiple specific blocks, and the method further comprises:

selecting a portion of blocks corresponding to time information existing prior to a time point from said multiple blocks as said multiple specific blocks, and then determining a sequential order to perform the garbage collecting operation upon said multiple specific blocks according to the number of invalid pages in said multiple specific blocks.

15. The method of claim 14, wherein specific blocks that correspond to more invalid pages are of higher priority in the garbage collecting operation.

16. The method of claim 9, further comprising:

selecting a portion of blocks corresponding to time information existing prior to a time point from said multiple blocks, and then selecting the at least one specific block having the number of invalid pages greater than a threshold value from the portion of blocks.

17. An electronic device, comprising:

a flash memory module, comprising multiple flash memory chips, each of the flash memory chips comprises multiple blocks, and each of the block comprises multiple pages; and a flash memory controller, arranged to access the flash memory module;

wherein the flash memory controller generates current time information; when the flash memory controller writes data into any block of said multiple blocks, the flash memory controller sends a request command to a host device via a specific pin in order to request the host device to provide the current time information, and the flash memory controller writes the data with the time formation into the block; and the flash memory controller further selects at least one specific block to perform the garbage collecting operation on according to the number of invalid pages in each block and the time information corresponding to said each block.

18. The electronic device of claim 17, wherein the at least one specific block comprises multiple specific blocks, and the flash memory controller further determines a sequential order to perform the garbage collecting operation upon said multiple specific blocks according to the number of invalid pages in each block and the time information corresponding to said each block.

* * * * *